US010072558B2

(12) United States Patent
Zhou

(10) Patent No.: US 10,072,558 B2
(45) Date of Patent: Sep. 11, 2018

(54) COMPRESSION-IGNITION LOW OCTANE GASOLINE ENGINE

(76) Inventor: Xiangjin Zhou, Beijing (CN)

(*) Notice: Subject to any disclaimer, the term of this patent is extended or adjusted under 35 U.S.C. 154(b) by 283 days.

(21) Appl. No.: 13/806,419

(22) PCT Filed: Jul. 5, 2011

(86) PCT No.: PCT/CN2011/001106
§ 371 (c)(1),
(2), (4) Date: Feb. 8, 2013

(87) PCT Pub. No.: WO2012/003713
PCT Pub. Date: Jan. 12, 2012

(65) Prior Publication Data
US 2013/0160729 A1 Jun. 27, 2013

(30) Foreign Application Priority Data
Jul. 7, 2010 (CN) .......................... 2010 1 0227388

(51) Int. Cl.
F02B 43/00 (2006.01)
F02B 7/06 (2006.01)
(Continued)

(52) U.S. Cl.
CPC .................. *F02B 7/06* (2013.01); *F02B 3/06* (2013.01); *F02B 9/02* (2013.01); *F02D 13/0203* (2013.01);
(Continued)

(58) Field of Classification Search
CPC ...... F02B 1/04; F02B 3/06; F02B 1/12; F02D 41/3011; F02D 41/30; F02D 41/34; Y02T 10/128
(Continued)

(56) References Cited

U.S. PATENT DOCUMENTS 5,243,947 A * 9/1993 Yamamoto ............ F02D 35/023
123/458
2001/0022168 A1 * 9/2001 Teraji ........................ F02B 1/12
123/295
(Continued)

FOREIGN PATENT DOCUMENTS

CN 1196445 A * 10/1998
CN 1196445 A 10/1998
(Continued)

OTHER PUBLICATIONS

International Searching Authority, International Search Report, dated Oct. 20, 2011 (PCT/CN2011/001106).
(Continued)

Primary Examiner — Lindsay Low
Assistant Examiner — Omar Morales
(74) Attorney, Agent, or Firm — Liu Law Office; Helen Liu

(57) ABSTRACT

A compression-ignition low octane gasoline engine. The engine uses low octane gasoline and a compression-ignition method, does not require a spark plug, and compared with ordinary gasoline engines, increases thermal efficiency by approximately 40% and reduces green-house effects caused by emissions by approximately 45%. The "compression-ignition" of the low octane gasoline engine is a diffusion charge compression-ignition, differing from a homogeneous charge compression-ignition. The compression ratio in a cylinder can be 14 to 22, while an ordinary gasoline engine has a compression ratio of 7 to 11. The low octane gasoline engine has a simple structure, easy combustion control, a low noise level, and a low failure rate. As the low octane gasoline can be free of aromatic hydrocarbons, and not require the addition of antiknock agents such as MTBE and MMT, the present novel gasoline engine is a highly efficient,
(Continued)

clean, and environmentally friendly internal combustion engine.

19 Claims, 1 Drawing Sheet

(51) Int. Cl.
| | |
|---|---|
| *F02D 41/00* | (2006.01) |
| *F02D 41/30* | (2006.01) |
| *F02B 3/06* | (2006.01) |
| *F02B 9/02* | (2006.01) |
| *F02D 13/02* | (2006.01) |
| *F02D 15/00* | (2006.01) |
| *F02D 41/06* | (2006.01) |
| *F02D 41/40* | (2006.01) |
| *F02D 41/38* | (2006.01) |

(52) U.S. Cl.
CPC ......... *F02D 15/00* (2013.01); *F02D 41/0025* (2013.01); *F02D 41/3011* (2013.01); *F02D 41/0002* (2013.01); *F02D 41/0007* (2013.01); *F02D 41/062* (2013.01); *F02D 41/402* (2013.01); *F02D 2013/0292* (2013.01); *F02D 2041/001* (2013.01); *F02D 2041/389* (2013.01); *Y02T 10/128* (2013.01); *Y02T 10/18* (2013.01)

(58) Field of Classification Search
USPC ............. 123/1 A, 260, 299, 261, 276, 143 A
See application file for complete search history.

(56) References Cited

U.S. PATENT DOCUMENTS

| | | | | |
|---|---|---|---|---|
| 2005/0126545 A1* | 6/2005 | Shafer | ............ | F02M 59/20 |
| | | | | 123/495 |
| 2008/0110422 A1* | 5/2008 | Kitamura | ............ | F01L 1/185 |
| | | | | 123/27 R |
| 2008/0202467 A1* | 8/2008 | Walter | ............ | F02D 13/0261 |
| | | | | 123/295 |
| 2011/0186011 A1* | 8/2011 | Kubo | ............ | F02M 43/04 |
| | | | | 123/445 |
| 2011/0209686 A1* | 9/2011 | McCann | ............ | F02M 53/06 |
| | | | | 123/304 |
| 2012/0255520 A1* | 10/2012 | Grover, Jr. | ............ | F02F 3/28 |
| | | | | 123/445 |

FOREIGN PATENT DOCUMENTS

| | | | |
|---|---|---|---|
| CN | 1305052 A | * | 7/2001 |
| CN | 1305052 A | | 7/2001 |
| CN | 1774566 A | | 5/2006 |
| CN | 2888092 Y | * | 4/2007 |
| CN | 2888092 Y | | 4/2007 |
| CN | 102312719 B | | 8/2013 |
| JP | 63124830 A | | 5/1988 |
| JP | 7247872 A | | 9/1995 |

OTHER PUBLICATIONS

International Searching Authority, Written Opinion of the International Searching Authority, dated Oct. 20, 2011 (PCT/CN2011/001106).

* cited by examiner

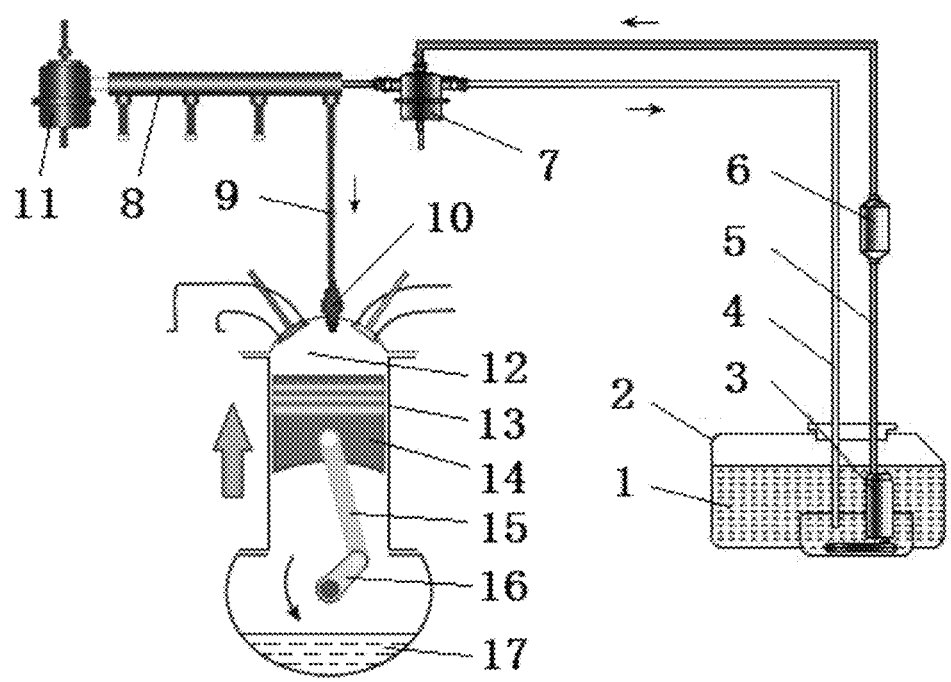

COMPRESSION-IGNITION LOW OCTANE GASOLINE ENGINE

TECHNICAL FIELD

This invention belongs to the technical field of internal combustion engine in mechanical industry. It relates to a novel internal combustion engine.

BACKGROUND

1. Comparison Between Diesel Engine and Gasoline Engine

Generally, as compared to gasoline engines (spark-ignition engines), diesel engines (compression-ignition engines) increase thermal efficiency by approximately 30% (20-40% claimed in some references) and reduce green-house effects caused by emissions by approximately 45%. They also have a lower carbon monoxide and HC emission. Diesel engines have simple structures and low failure rate, but have the defect of emitting large harmful particles.

As compared to diesel engines, gasoline engines are different in fuel storage and delivery system. Gasoline is more volatile and wettable. Gasoline engines and diesel engines have different manners in fuel feeding. For gasoline engines, gasoline is injected into air passage and mixed with air before entering into cylinders, while for diesel engines, air is firstly compressed with cylinder pistons and then diesel is injected into cylinders with injection nozzle.

In recent years, there appears a GDI (gasoline direct injection) gasoline engine in market, wherein part of gasoline is pre-injected into cylinders to be pre-blended with air during compression phase, and after piston arrives at the upper dead point, gasoline is injected into cylinders for multiple times, adopting spark plug ignition. This engine uses high rating gasoline, and its compression ratio is fairly improved but not too much. Another Homogeneous Charge Compression Ignition (HCCI) gasoline engines is still under research phase, which may achieve compression-ignition and multi-ignition through pre-injection (premixing gasoline with air) and multiple injection gasoline, appropriately elevating compression ratio and heating with heater plug. Nevertheless, HCCI gasoline engines have problems in combustion controlling and rough operations, and are difficult to be popularized.

As to rough operations of diesel engines: since diesel's kinematic viscosity is rather high, diesel has to be injected into cylinders with high pressure oil pump so as to be sufficiently atomized For achieving a well mixing of diesel with air, this oil pump injection pressure sometimes may reach as high as 1800 to 2000 atmospheric pressure. Therefore, conventional diesel engines generally inject diesel into cylinders within a very short period, so that the atomized diesel spontaneously ignited after mixed with air, causing deflagration by igniting multiple sites at the same time, raising much noise and vibration, hence resulting in rough operations.

Modern diesel engines have already adopted some advanced technologies, such as turbocharging, intercooler, direct injection, catalytic conversion of exhaust gas and particle collection, etc. The emissions of vehicles with diesel engine have met the Euro III, Euro IV and even Euro V emission standards.

2. Engine Compression Ratio and Heat Efficiency

Theoretically, the higher the compression ratio is, the more efficient the engine. The general compression ratio of gasoline engine is 7 to 11, high octane rating (high grade) gasoline needs to be used. The general compression ratio of diesel engine is 15 to 18, and some may reach as high as 18 to 22. Nevertheless, due to the limitation of the strength of cylinders materials, its compression ratio cannot be too high.

3. Specific Fuel Consumption

Fuel consuming rate refers to fuel quantity (based on the unit g) consumed in 1 hour for each 1 kw efficient power the engine produces. Obviously, the lower the fuel consuming rate, the more economic the engine.

4. Aromatic Hydrocarbon and Octane Rating

Gasoline contains xylene, ethylbenzene, toluene, methylethyl benzene or other benzene derivatives, which are all named aromatic hydrocarbon. Aromatic hydrocarbon generally has a high octane rating, but is slightly toxic. The exhaust gas produced by the combustion of aromatic hydrocarbon contains PAHs, which will cause cancer.

In order to increase gasoline's octane rating, refineries generally adopt "reforming" process, converting straight-chain alkanes into aromatic hydrocarbon. This process consumes a large amount of energy and wastes part of the raw materials.

5. Antiknock Agents

To increase gasoline octane rating, engineers have also developed antiknock agents, e.g., methyl cyclopentadienyl manganese tricarbonyl (MMT), methyl tert-butyl ether (MTBE), TAME, etc. Use of MMT and MTBE often causes secondary contamination to the environment. MTBE is prohibited in some states in US by regulations.

6. Octane Rating and Cetane Value

Among the quality indexes of diesel, cetane value is a primary index determining whether diesel can be compressively ignited. Generally, diesel should have a cetane value of 40 to 60, and the higher the cetane value, the easier diesel engines can be compressively ignited. Research shows that a cetane value of 40 is equivalent to an octane rating of 50, and a cetane value of 60 is equivalent to an octane rating of 30. As a matter of fact, the lower the gasoline octane rating is, the easier it can be compressively ignited.

7. Novel Engine With Diesel Engine Advantages in Combination With Gasoline Engine Advantages Diesel engine has a heat efficiency higher than gasoline engine, mainly because it has a higher compression ratio and a higher air-fuel ratio. Gasoline has a better volatility than diesel, and a better air-mixing homogeneity than diesel. The carbon black particle impurity left in the exhaust gas is less than diesel.

The present invention designs a compression-ignition gasoline engine with high compression ratio. And this novel internal combustion engine has so far not been reported yet.

BRIEF DESCRIPTION OF FIGURE

FIG. 1 shows a compression-ignition low octane gasoline engine according to an embodiment.

Reference to the details of the FIG. 1 is provided as below: 1. low octane rating gasoline; 2. fuel tank; 3. fuel pump; 4. fuel pipe; 5. fuel pipe; 6. fuel filter of gasoline; 7. high pressure fuel pump; 8. high pressure fuel rail; 9. high pressure fuel pipe; 10. spray nozzle; 11. valve; 12. combustion chamber; 13. cylinder; 14. piston; 15. connecting rod; 16. crankshaft; 17. lubricating oil system.

SUMMARY OF THE INVENTION

Taking advantage of the characteristic that low octane rating gasoline has a fairly low spontaneous ignition temperature, and that the heat efficiency of compression ignition internal combustion engine is higher than spark ignition internal combustion engine, a compression-ignition gasoline engine is designed, which uses low octane gasoline as the fuel, elevates the heat efficiency of gasoline engines (compression-ignition low octane rating gasoline engine) to the level of diesel engines, and at the same time reduces green-house effects produced by gasoline engine emission.

Compression-ignition low octane rating gasoline engines adopts diffused compression ignition, which is different from homogeneous charge compression ignition.

Experimental data shows that, the specific fuel consumption of compression-ignition low octane gasoline engines is 10 to 15% lower than that of diesel engines. That is, the heat efficiency conversion rate of compression-ignition low octane gasoline engines is 10 to 15% higher than diesel engines. Therefore, the heat efficiency conversion rate of compression-ignition low octane rating gasoline engines is about 30 to 55% higher than spark ignition gasoline engines.

Due to the difficulty and technological complexity in producing high octane rating gasoline (gasoline having octane rating above 90, research method), the appearance of compression-ignition low octane gasoline engines will reduce difficulty and technological complexity in gasoline production of refineries.

1. The Present Invention Provides a Technical Solution and a Technical Measure for Compression-Ignition Low Octane Rating Engine.

(1) Increasing the compression ratio of gasoline engine by 14 to 22, in order to improve the heat efficiency conversion rate of gasoline engines. For gasoline engines adopting inlet air compression technique, including turbocharging technique and intercooling technique, the compression rate can be within the range of 7 to 15, or 15 to 18.

(2) Using gasoline having octane rating of 30 to 50 as fuel, the cetane value of such gasoline is equivalent to 40 to 60, which can be compression-ignited under said compression ratio. In practice, according to the compression ratio and relevant parameters of the compression-ignition gasoline engines, the gasoline octane rating can be appropriately adjusted, e.g., to 55, 59, etc., as long as gasoline can be ignited and has reliable compression ignition.

(3) Using high pressure gasoline oil pump and high pressure gasoline injection nozzle, it can be ensured that gasoline having a low octane rating can be effectively injected into cylinders, and that gasoline is injected into the cylinders in such a pressure that gasoline can be homogeneously dispersed in the air within cylinders. This high pressure gasoline oil pump has a relatively low injection pressure than diesel oil pump.

(4) Using gasoline storage and delivery system, e.g., fuel tank, fuel pump, fuel tube, valve, fuel meter, etc.

(5) In combustion control, engine efficiency is improved through extending injection time and decreasing injection speed. In the meantime, the following shall be prevented: knocking by mixture of air and fuel, overly high pressure in combustion chamber when piston is near to top dead point, and the engine's rough operations. Controlling gasoline fuel to be combusted before forming a 90 degree angle and after the formation of a 60 degree angle between crank arm and connecting rod is the second crucial technical means for improving engine efficiency of the present invention. The design scheme and technical measure are also applicable to diesel engines.

(6) Combustion control can be optimized with multiple injection fuel supply technology. Where multiple injection fuel supply technology is not adopted, the engine structure will be simplified, even without containing circuit and electron components.

2. Technical Problems to be Solved by the Present Invention (1) To solve the problems that the compression ratio of gasoline engines is lower than diesel engines, heat efficiency and power output performance is inferior to diesel engines, and the gasoline fuel is less economic than diesel.

(2) To overcome the difficulties that low octane gasoline cannot be used in diesel engines, and to avoid the problems of lubrication and abrasion of plunger and rotating elements when using fuel pump and fuel nozzle of diesel engines in injecting low octane gasoline fuel.

(3) To optimize combustion control, solve the problems of rough operations and noise of compression-ignition internal combustion engine (including diesel engines and low octane rating gasoline engines), and further improve the engine efficiency.

(4) To solve the problems of diesel engines in their emission of large amount of carbon black and other granular impurities and carbon monoxide, and of gasoline engines in their emission of large amount of polycyclic aromatic hydrocarbon and hydrocarbon.

(5) To solve the problem that gasoline requires anti-knocking agent and to achieve the target of clean, no-aromatic hydrocarbon containing gasoline.

3. Technical Solutions of the Present Invention and Effect Achieved by the Technical Measure (1) Compression-ignition low octane rating gasoline engines have both advantages of the diesel engines and the gasoline engines. It has high efficiency and high power as in diesel engines (the diameter of cylinders may be increased like that of a diesel engine, but having no risk of knocking); it also has low emission as in gasoline engines (the emission of carbon black and other granular impurities as well as carbon monoxide of gasoline engines are lower than that of diesel engines); the hydrocarbon emission index is lower than the lately marketed GDI gasoline engines, and is also lower than (HCCI) gasoline engines.

Since the volatility of gasoline is better than that of diesel, low octane gasoline, after injected into the cylinders, may rapidly be mixed with air and burned sufficiently, hence exhaust gas has no granular impurities like carbon black, and the emission of carbon monoxide is very low (as compared with diesel engines using diesel). Therefore, its efficiency is 10 to 15% higher than diesel engines, and 30 to 55% higher than ordinary gasoline engines.

(2) Using the technique of extending fuel injection, low octane rating gasoline engines may be simple mechanical devices comprising no circuits and electronic components. Hence, in addition to high heat efficiency conversion rate, it has the advantage of low malfunction rate.

(3) When using the technique of extending fuel injection, diesel engines may not only comprise no circuits and electronic components, but also have the advantage of low malfunction rate, under which circumstance they may have an improved efficiency, soft operation and lowered noise.

(4) Exhaust gas of low octane rating gasoline engines does not comprise aromatic hydrocarbon.

(5) Using multiple injection fuel supply technique, the combustion control of compression-ignition low octane rating gasoline engines can be further optimized, and heat efficiency conversion rate can be further improved.

(6) Some internal combustion engine experts commented that: low octane gasoline is a fuel more suitable for diesel engines diesel than fuel, while compression-ignition low octane rating gasoline engines may be the most perfect internal combustion engine in history.

4. Conception of Low Octane Gasoline

Generally, gasoline having an octane rating less than 60 (study) is called as low octane gasoline. Similar to high octane rating gasoline, low octane rating gasoline number can be determined by its octane rating, e.g., gasoline having an octane rating of 40 can be called Gasoline #40. The smaller the number of low octane rating gasoline, the better it suits different compression ratio of compression-ignition gasoline engines, but the higher its cost is. For example, Gasoline #10 (octane rating of 10) has a better compatibility to compression-ignition gasoline engines of lower compression ratio than Gasoline #30 (octane rating of 30).

5. Working Process of Compression-ignition Low Octane Gasoline Engines

FIG. 1 shows a compression-ignition low octane gasoline engine according to an embodiment. According to an embodiment in FIG. 1, when piston 14 compresses air into combustion chamber 12, piston 14 reaches or gets close to the top dead point, low octane rating gasoline 1 is injected into cylinders 13 with fuel pump 3 and spray nozzle 10, automatically ignited and burned in the high temperature, high pressure air of the cylinders 13, produces even higher pressure and drives piston 14 to move towards the bottom dead point, and does the work. By reducing injection speed and extending injection period, the mixing time of gasoline and air in the cylinders 13 is prolonged, the mixing is sufficient, burning is sufficient and soft, and noise is lowered.

6. Concept of Time

The time in this description concerning processing of engine piston, and the time when spray nozzle 10 starts and ceases injection, are all relative and refers to the angle the crankshaft 16 rotates. For example, the running time of piston 14 from top dead point to bottom dead point is 180 degree angle, correspondingly the crankshaft 16 rotates 180 degree angle. Assuming that the spray nozzle 10 starts injection at 5 degree angle before top dead point, and ends at 55 degree angle of top dead point, the injection time is 60 degree angle, equivalent to the relative time that crankshaft 16 rotates 60 degree angle. When the injection time is 60 degree angle, if the engine rotates at a speed of 1200 rpm (1/20 second per rotation), the injection time is 1/120 second).

Difference Between Compression-ignition Low Octane Gasoline Engines and Ordinary Gasoline Engines and Diesel Engines (1) Difference in fuel, which is a characteristic that distinguishes compression-ignition gasoline engines from ordinary gasoline engines and diesel engines. Since diesel and gasoline is different in structure and component, gasoline' volatility, permeability and wettability is stronger than diesel, diesel (high viscosity) has a higher kinematic viscosity than gasoline, the structure and performance of the fuel tank 2, fuel pipe 4, 5, fuel pump 3 and spray nozzle 10 of compression-ignition low octane gasoline engines are greatly different from those of diesel engines. Hence ordinary diesel engines cannot be used as low octane gasoline engines.

Here comes the conclusion: even if the compression ratio of a compression-ignition gasoline engine is equivalent to that of a diesel engine, the compression-ignition gasoline engine and a diesel engine are two totally different internal combustion engine products.

Compression-ignition gasoline engine uses low octane gasoline. As compared to high octane rating gasoline, low octane rating gasoline has three main advantages: clean—no aromatic hydrocarbon, and no anti-knocking agent; environmental friendly—the exhaust gas contains no polycyclic aromatic hydrocarbon; low cost—no need of molecular conversion technology such as "reformation" to improve gasoline octane rating.

Low octane rating gasoline is different from diesel, and grade is determined according to the octane rating that the auto-ignition point corresponds to, such as: Gasoline #45, Gasoline #40, Gasoline #35, Gasoline #30, Gasoline #20, etc., so as to be compatible with low octane gasoline engines with different compression ratio. Nevertheless, diesel does not have the grade number directed to diesel engines with different compression ratio.

The high pressure injection fuel pump and spray nozzle of low octane gasoline is different from those of diesel engines.

(2) Different manners of ignition is a second characteristic distinguishing compression-ignition gasoline engines from ordinary gasoline engines.

Compression-ignition gasoline engines adopt the manner that fuel automatically ignites within the cylinders, while ordinary gasoline engines adopt electronic ignition system, such as spark plug.

Electronic ignition system can be absent from the compression-ignition gasoline engines. Hence, the structure is more simple and the failing rate is lower than ordinary gasoline engines.

The method of prolonging the time of injecting to the burning chamber also suits diesel engines. Diesel engines, without multipoint injection technique, may also improve efficiency, reduce noise, achieve soft working, and have a simple structure.

(3) Different compression ratio is a third characteristic which distinguishes compression-ignition gasoline engines from gasoline engines and diesel engines. Once compression-ignition low octane gasoline engine is modeled, the compression ratio is determined. The octane rating (gasoline grade) of the low octane rating gasoline has an upper limit. Only when gasoline having a grade equal to or lower than that grade is used can compression ignition low octane rating gasoline engine work normally.

On the contrary, the lower the gasoline grade is, the lower the compression ratio of the compression-ignition gasoline engine can be (e.g., choosing the compression ratio to be 10 to 14), and the softer and more stable the engine will run.

The standard data of what cylinders compression ratio corresponds to what grade of low octane gasoline can easily be obtained by persons skilled in the art by backward tests using test devices of gasoline octane rating.

The compression ratio of compression-ignition gasoline engines is higher than ordinary gasoline engines, but requires different grades of low octane gasoline.

a. In order to achieve a higher efficiency of the engine, the compression ratio of the compression-ignition gasoline engine can be designed within the range of 18 to 20 (even within the range of 19 to 22), this kind of compression-ignition gasoline engine may use gasoline having a comparatively higher grade of the low octane rating gasoline products.

b. In order to make the engine run softly and stably, the compression ratio of the compression-ignition gasoline engine can be set within the range of 10 to 14 (even within the range of 7 to 10). Especially in using air pressurization technology, comparatively low compression ratio still has a comparatively high heat efficiency conversion rate, the increase of air-fuel ratio is also good for improvement of engine efficiency. As such, the gasoline products of low grade having low octane rating may be used in compression-ignition gasoline engines having a comparatively low compression ratio (e.g., compression-ignition gasoline engines having a compression ratio of 12 to 14). Even so, the compression ratio of such compression-ignition gasoline engines is still higher than that of spark ignition gasoline engines(ordinary), so are their heat efficiency, and the green effect produced by emission is also lower.

(4) Difference in fuel feeding

Compression-ignition gasoline engines uses spray nozzle to inject fuel into the cylinders, while ordinary gasoline engines use spray nozzle to inject fuel into the air pipe, where it is mixed with air before enters the cylinders. Of course, currently there are some gasoline engines adopt direct injection technique, but there is still the difference in ignition manners.

(5) Difference in efficiency

The heat efficiency of compression-ignition gasoline engines is about 40 to 55% higher than gasoline engines (about 10 to 15% higher than diesel engines). For example : if an automobile with ordinary gasoline engine consumes 8 L gasoline/100 km (assuming No. 93 gasoline, 40 L gasoline may drive 500 km), when this automobile uses compression-ignition low octane rating gasoline engine, the fuel consumption per 100 km is about 5.7 L (40 L gasoline may drive 700 km).

(6) Difference in fuel injection speed

In order to lower the noise and vibration of engines, compression-ignition low octane gasoline engines reduces the fuel feeding speed (injection speed), which is equivalent to decreasing the burning speed of fuel-air mixture in the cylinders, relieves the strike of knocking gas against cylinders and piston.

(7) Different starting manner a. In starting a compression-ignition gasoline engine, fuel feeding amount to cylinders from spray nozzle is reduced by controlling spray nozzle, so as to prevent too much accumulation of fuel at the first compression ignition.

b. In starting a compression-ignition gasoline engine manually with a crank, fuel path is cut before releasing the open-closing lever of the closing valve of the cylinders, so as to stop feeding cylinders with fuel.

(8) Difference in lubricating theory and lubrication system and lubrication oil

The lubrication system of compression-ignition low octane rating gasoline engines is different from that of diesel engines, and is closer to that of gasoline engines.

(9) Difference in greenhouse gas emission standard

Using fuel of the same unit quantity, green-house effect produced by compression-ignition gasoline engine emission is about 40 to 55% lower than that of gasoline engine.

Persons skilled in the art are familiar with the working theory, mechanical structure and difference of compression-ignition engines and spark ignition engines, and hence this description skips detailed illustrations thereof without affecting understanding of the present invention for persons skilled in the art.

Compression-ignition gasoline engines have advantages of both gasoline engines and diesel engines, but are different from conventional gasoline engines and diesel engines. Therefore, the present invention is not only utilizable, but also novel and inventive.

8. Relevant Claims (1). A compression-ignition low octane gasoline engine, characterized in that: using low octane gasoline as fuel, using compression ignition, having a high compression ratio of 10 to 22;

By using air pressurization technology such as turbocharging or intercooler, the engine may adopt lower compression ratio, such as a compression ratio of 7 to 15, or 15 to 18, the engine still has power performance better than ordinary gasoline engines;

Electronic control multipoint injection system can be absent, such as spark plug, heater plug.

Adopting electronic control multipoint injection system, or default electronic control multipoint injection system. Hence, the engine has a simple structure, and a low failing rate.

(2) According to claim 1, adopting lubricating system and fuel storage-delivery system that a gasoline internal combustion engine needs (similar to fuel tank, fuel pipe system of a gasoline engine), and high pressure fuel pump and spray nozzle that a compression-ignition engine needs (similar to fuel pump and spray nozzle of a diesel engine), but a high pressure gasoline fuel pump and spray nozzle specially designed to suit low octane rating gasoline.

(3) According to claim 1, in order to reduce shock and vibration toward the engine caused by knocking of mixed fuel and air after fuel is injected into the air thank through spray nozzle, adopting measures to slow injection speed of working process (prolong injection time), prolonging injection ending time to between 45 to 105 degree angle of the crankshaft rotation angle (when piston is at the top dead point, the crankshaft rotation angle is 0), typically between 45 to 75 degree angle; so that the fuel burning time is close to ordinary gasoline engine. Under the circumstance that fuel consumption is the same, the output efficiency is further improved.

There is no need to pre-inject gasoline into the cylinders at a larger rotation angel (e.g., within the range of 50-60 degree angle) before the piston reaches the top dead point, or to pre-blend gasoline when air enters air passage to form homogeneous fuel-gas mixing layer;

Injection starting time may be brought forward to 0 to 5 degree angle before piston reaches the top dead point, or 5 to 10 degree angle, to make sure that a small amount of the first batch gasoline that is injected into the cylinders, after mixed with air, is ignited within 0-10 degree angle after the piston passes the top dead point.

(4) According to claim 1, during the engine starting stage, respectively or simultaneously adopting the following two measures to reduce granular emission in tail gas produced by incomplete fuel burning including carbon black:

a. In starting state, reducing the amount of low octane gasoline that is injected into cylinders through spray nozzle during each working process;

b. Before the engine's rotation speed reaches a prescribed speed (e.g., the preset idling speed), cutting off oil path to stop feeding cylinders with fuel; when the engine's rotation speed reaches a prescribed speed (e.g., the preset idling speed), starting feeding cylinders with fuel, so as to avoid incomplete burning and appearance of carbon black and other granular impurities by too much fuel accumulation within the cylinders at the first compression ignition;

when starting the engine manually with crank, before releasing the lever (handle) of the cylinders closing valve, cutting off the fuel path of the high pressure fuel pump or spray nozzle, and stopping injection fuel to the cylinders, namely that: when pressing the lever (handle) that opens closing valve of the cylinders, the valve that feeds fuel to high pressure pump or spray nozzle is closed; after releasing the handle, the valve that feeds fuel to spray nozzle is opened.

Specific Embodiments

EXAMPLE 1

A low octane rating gasoline compression feasibility test is carried out using a 4-stroke, 110 mm single chamber internal combustion engine having a compression ratio of 17.6. The engine uses natural aspiration and manual starting with crank. As a result, the engine successfully ignites three low grade gasoline samples having octane ratings of 39.3, 25 and 12.5. The engine runs normally after starting.

EXAMPLE 2

A bench test is carried out using a 4-stroke, 93 mm four-chamber internal combustion engine having a compression ratio of 18. The engine uses water cooling and natural aspiration. The result shows, according to the load curve and speed curve, the specific oil consumption of the compression-ignition low octane gasoline engine is 10-15% than the specific fuel consumption of diesel engine of the same type when using diesel.

EXAMPLE 3

There is in market a high pressure gasoline injection pump having an injection pressure of 17 MPa, basically meeting the requirement of compression-ignition low octane rating gasoline engines. In the future, when there is gasoline injection pump providing higher pressure matching compression-ignition low octane gasoline engines, it will meet the demand of compression-ignition low octane gasoline engines of even higher compression ratio.

The invention claimed is:
1. A gasoline internal combustion engine, comprising:
a crankshaft,
a connecting rod,
a piston and a cylinder, the piston and cylinder defining a combustion chamber,
a pressure control valve,
a high pressure gasoline injection pump,
a nozzle,
a lubricating oil system suitable for gasoline engine,
wherein the gasoline internal combustion engine does not have a spark plug;
wherein the gasoline internal combustion engine is configured to intake air without gasoline mixed therewith into the combustion chamber during an intake stroke in which the piston moves from a top dead center (TDC) to a bottom dead center (BDC);
wherein the gasoline internal combustion engine is configured to inject a low octane number gasoline into the combustion chamber during a compression stroke in which the piston moves from the BDC to the TDC;
wherein the gasoline internal combustion engine is configured to run using the low octane number gasoline with a Research Octane Number (RON) of 60 or lower;
wherein the gasoline internal combustion engine is configured to ignite the low octane number gasoline upon injection into the combustion chamber by diffused compression ignition, and
the combustion of a mixture of the low octane number gasoline and air is a stratified combustion.
2. The gasoline internal combustion engine of claim 1, wherein the gasoline internal combustion engine is configured to inject the low octane number gasoline into the combustion chamber until the piston reaches a value from 45° to 105° after the TDC.
3. The gasoline internal combustion engine of claim 1, wherein the gasoline internal combustion engine has a compression ratio from 7 to 22, wherein the gasoline internal combustion engine is a naturally aspirated engine.
4. The gasoline internal combustion engine of claim 1, wherein the gasoline internal combustion engine has a compression ratio from 7 to 22, wherein the gasoline internal combustion engine is a forced induction engine.
5. The gasoline internal combustion engine of claim 1, wherein the gasoline internal combustion engine has a compression ratio from 7 to 15, wherein the gasoline internal combustion engine is a forced induction engine.
6. The gasoline internal combustion engine of claim 1, wherein the gasoline internal combustion engine has a compression ratio from 15 to 18, wherein the gasoline internal combustion engine is a naturally aspirated engine.
7. The gasoline internal combustion engine of claim 1, wherein the gasoline internal combustion engine has a compression ratio from 15 to 18, wherein the gasoline internal combustion engine is a forced induction engine.
8. The gasoline internal combustion engine of claim 1, wherein the gasoline internal combustion engine has a compression ratio from 14 to 22, wherein the gasoline internal combustion engine is a naturally aspirated engine.
9. The gasoline internal combustion engine of claim 1, wherein the gasoline internal combustion engine has a compression ratio from 14 to 22, wherein the gasoline internal combustion engine is a forced induction engine.
10. The gasoline internal combustion engine of claim 1, wherein the nozzle is configured to inject the low octane number gasoline into the combustion chamber.
11. The gasoline internal combustion engine of claim 1, further comprising a gasoline pump, a gasoline tank, a gasoline filter, a gasoline pipe system, an air booster, an air cooler, an exhaust treatment device, a particulate trap, or a combination thereof.
12. A method of starting the gasoline internal combustion engine of claim 1, comprising injecting no low octane number gasoline into the cylinder before the gasoline internal combustion engine reaches a predetermined speed below an idle speed of the gasoline internal combustion engine.
13. A method of using a gasoline internal combustion engine comprising a crankshaft, a connecting rod, a piston and a cylinder, the piston and cylinder defining a combustion chamber, a pressure control valve, a high pressure gasoline injection pump, a nozzle, a lubricating oil system suitable for gasoline engine, wherein the gasoline internal combustion engine does not have a spark plug;
the method comprising:
intaking air without low octane number gasoline mixed therewith into the combustion chamber, during intake stroke in which the piston moves from the TDC toward the BDC;
injecting the low octane number gasoline into the combustion chamber during compression stroke in which the piston moves from the BDC toward the TDC;

igniting the low octane number gasoline injected into the combustion chamber by diffused compression ignition, and the combustion of a mixture of the low octane number gasoline and air is a stratified combustion.

14. The method of claim 13, further comprising injecting the low octane number gasoline into the combustion chamber when the piston is from 10° before, the TDC to the TDC.

15. The method of claim 13 further comprising compress air before the air reaches the combustion chamber.

16. The method of claim 13, wherein the low octane number gasoline has a Research Octane Number (RON) of 60 or lower.

17. The method of claim 13, further comprising injecting the low octane number gasoline into the combustion chamber until the piston reaches a value from 45° to 105° after the TDC.

18. The gasoline internal combustion engine of claim 1, wherein the gasoline internal combustion engine does not have an electronic control unit.

19. The gasoline internal combustion engine of claim 1, wherein the gasoline internal combustion engine does not have a circuit and electron components.

* * * * *